Jan. 4, 1944.　　　T. K. SHERWOOD　　　2,338,265
REFRIGERATION
Filed Sept. 6, 1941
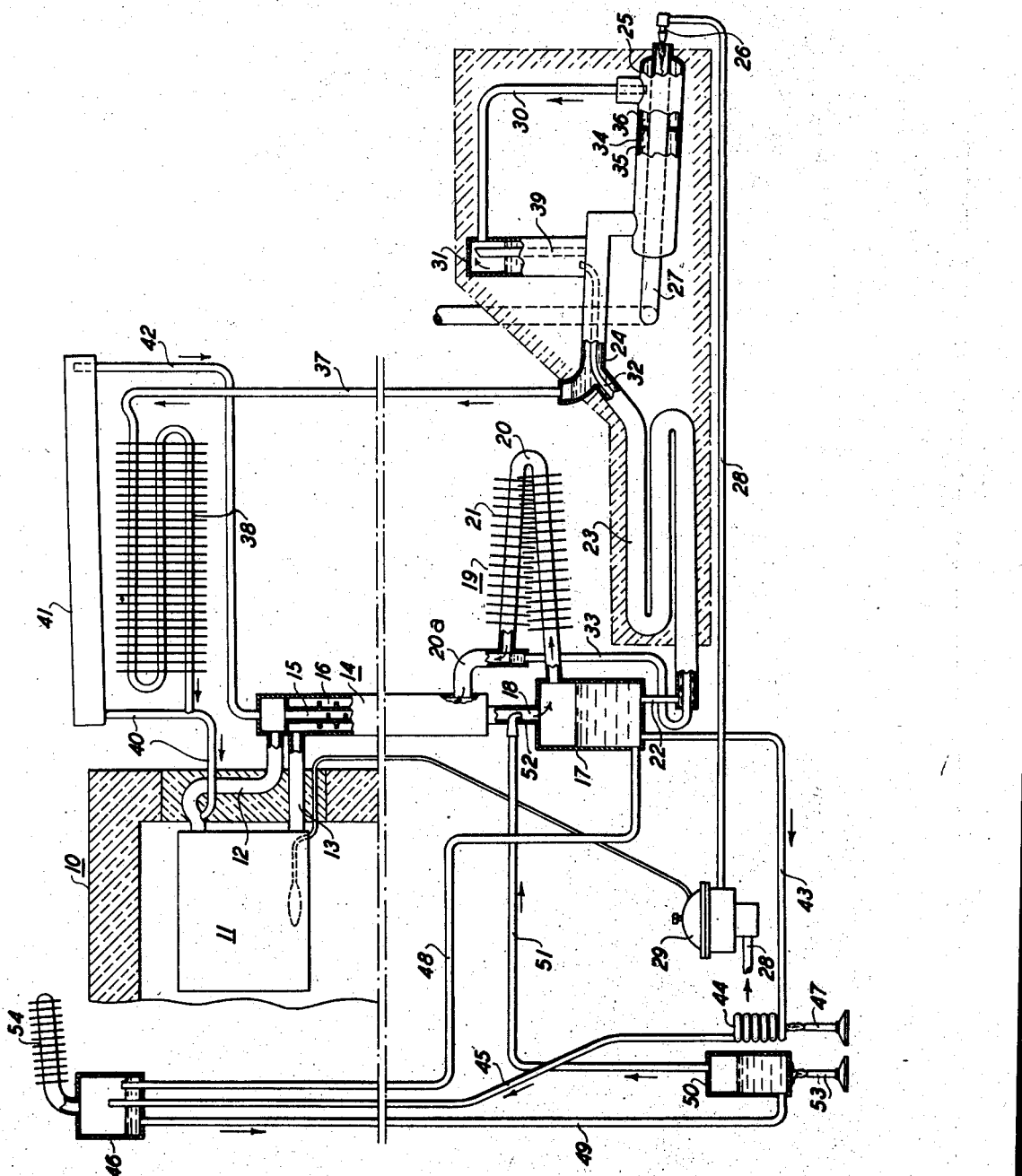
INVENTOR.
Thomas K. Sherwood
BY
D. E. Heath
his ATTORNEY Patented Jan. 4, 1944

2,338,265

UNITED STATES PATENT OFFICE 2,338,265

REFRIGERATION

Thomas K. Sherwood, Wellesley Hills, Mass., assignor to Servel, Inc., New York, N. Y., a corporation of Delaware Application September 6, 1941, Serial No. 409,764

10 Claims. (Cl. 62—119.5)

The subject of this invention is diffusion type absorption refrigeration systems and the object of the invention is to provide such a system having improved vapor actuated propulsion of inert gas.

The drawing shows more or less diagrammatically a refrigeration system embodying the invention.

The system shown is generally like that shown and described in Patent No. 2,164,045 to H. M. Ullstrand and A. R. Thomas, granted June 27, 1939. Briefly, a refrigerator cabinet 10 is cooled by an evaporator 11. The evaporator is connected by pipes 12 and 13 to a gas heat exchanger 14 having inner and outer passages 15 and 16. An absorber vessel 17 is connected by a pipe 18 to the inner heat exchanger passage 15. An absorber 19 comprises a pipe coil 20 provided with fins 21 for air cooling. The lower end of pipe coil 20 is connected to absorber vessel 17. The upper end of coil 20 is connected to the outer heat exchanger passage 16 by a conduit 20a. The evaporator 11, heat exchanger 14, absorber vessel 17, and absorber 19, together with the described interconnecting conduits form a circuit for inert gas, such as hydrogen.

The absorber vessel 17 is connected for flow of liquid therefrom through a conduit 22, outer passage of a liquid heat exchanger 23, and an analyzer 24 to a generator 25. The generator is heated by a gas burner 26 which directs its flame into a generator heating flue 27. The burner 26 is supplied with gas through a line 28, in which there is a thermostatic control valve 29 operative responsive to temperature of the evaporator 11. The generator 25 is connected by a vapor lift conduit 30 to the upper part of a vessel 31. The lower part of vessel 31 is connected by a conduit 32, the inner passage of liquid heat exchanger 23, and a conduit 33 to the lower end of conduit 20a.

The circuit just described contains a suitable solution of refrigerant in an absorbent, such as a water solution of ammonia. Circulation of solution in this circuit is caused by vapor lift conduit 30, through which liquid is raised into vessel 31 by action of vapor formed in generator 25. Liquid rises in vessel 31 to such a level that liquid overflows from conduit 20a into the upper end of absorber coil 20. Liquid flows by action of gravity through the absorber coil, absorber vessel 17, liquid heat exchanger 23, and analyzer 24 to the generator 25.

In the generator 25 is a partition 34 which divides the generator into a chamber 35 and a chamber 36. These chambers are in communication through an opening in the lower part of partition 34. When burner 26 is operated to heat the generator, ammonia vapor is expelled from solution. Vapor expelled from solution in chamber 35 bubbles upward through liquid in the generator and in analyzer 24 and flows through a conduit 37 to an air cooled condenser 38. Vapor which is expelled from solution in generator chamber 36 flows upward through conduit 30 and lifts the liquid through this conduit into vessel 31. Vapor flows from vessel 31 through a conduit 39 into analyzer 24, where it bubbles through liquid and also flows through conduit 37 to the condenser 38.

Refrigerant vapor is liquefied in condenser 38 and the liquid flows through a conduit 40 into evaporator 11. The refrigerant liquid evaporates in evaporator 11 in the presence of the hydrogen producing a refrigerating effect for cooling cabinet 10. Refrigerant vapor is extracted from the inert gas in absorber 19 by absorption into solution flowing therethrough.

The upper end of conduit 40 is connected to a hydrogen reserve vessel 41. The other end of vessel 41 is connected by a conduit 42 to the gas circuit, the connection being made at the upper end of inner passage 15 of the gas heat exchanger 14. When ammonia vapor issues from the lower end of condenser 38, it flows through conduit 40 into vessel 41, driving ahead of it hydrogen gas which is thus displaced into the gas circuit. The increase in volume of refrigerant vapor causes increase in pressure of the system to resume condensation of refrigerant in the condenser. The movement of hydrogen into the gas circuit permits refrigeration to continue at the increased pressure.

The lower part of absorber vessel 17 is connected by a conduit 43 to the lower end of a coil 44. The upper end of coil 44 is connected by a conduit 45 to an elevated vessel 46. Coil 44 is heated by a suitable means represented as a gas burner 47. The lower part of absorber vessel 17 is also connected by a conduit 48 to the vessel 46. The bottom of vessel 46 is connected by a conduit 49 to the lower part of a vessel 50. The top of vessel 50 is connected by a conduit 51 to a nozzle 52. Nozzle 52 is located in conduit 18 and is directed toward absorber vessel 17. Vessel 50 is heated by any suitable means represented as a gas burner 53. An air cooled reflux condenser 54 is connected to the top of vessel 46.

Enriched absorption solution flows from absorber vessel 17 through conduit 43 to coil 44.

Vapor is expelled from solution in coil 44 and rises through conduit 45 into vessel 46, causing upward flow of liquid in conduit 45 into vessel 46 by known vapor lift action. The vapor enters condenser 54 and is liquefied, the liquid flowing back into vessel 46. The liquid flows from vessel 46 downward through conduit 49 into vessel 50. Vapor is expelled from the solution by heating in vessel 50. The vapor flows through conduit 51 to nozzle 52 from which it issues in the form of a jet directed toward absorber vessel 17. The vapor jet from nozzle 52 causes gas to circulate in the gas circuit in the direction of the jet as indicated by arrows on the drawing. Excess liquid in vessel 46 overflows into conduit 48 and returns therethrough to absorber vessel 17. The pressure of vapor in vessel 50 is balanced by a column of liquid in conduit 49. Since solution in coil 44 and vessel 50 is strong solution from the absorber, vapor expulsion for operation of the jet supply circuit takes place at a lower temperature than that in generator chamber 36 from which weak solution is supplied to the absorber. Thus, rejected heat, as from generator flue 27 or vapor line 37 may take the place of burners 47 and 53.

A single source of heat may be used in place of the two burners 47 and 53. The action of the vapor jet in nozzle 52, and therefore the rate of circulation in the gas circuit, may be varied by changing the heat input to coil 44 and vessel 50. Various changes and modifications may be made within the scope of the invention as set forth in the following claims.

What is claimed is:

1. A refrigeration system having an evaporator and an absorber in a gas circuit, a generator for expelling vaporous refrigerant fluid from absorption liquid, a liquefier for changing the expelled refrigerant vapor to liquid form for use in said evaporator, said generator and absorber being connected to provide a path of flow for absorption liquid in which weakened absorption liquid flows from the generator to the absorber and enriched absorption liquid flows from the absorber to the generator, a vapor jet directed to cause propulsion of gas in said gas circuit, a vaporizer for supplying vapor to said jet, and a line for supplying absorption liquid from said path of flow to said vaporizer and having a part at a level above said path of flow for absorption liquid.

2. A refrigerating system having a gas circuit including an evaporator and an absorber, a generator, said absorber and said generator being interconnected to provide a path of flow for absorption liquid, a vapor jet directed to cause propulsion of gas in said gas circuit, a vaporizer for supplying vapor to said jet, and a line for supplying absorption liquid from said path of flow to said vaporizer including a vapor liquid lift for raising liquid in said line to a level above said path of flow for absorption liquid.

3. A refrigeration system having a gas circuit including an evaporator and an absorber, a generator, said generator and said absorber being connected to provide a path of flow for absorption liquid, a vapor operated gas impeller in said gas circuit, a vaporizer for supplying vapor to said impeller, and a lift for raising absorption liquid from said path of flow to a level above said path of flow for supplying absorption liquid to said vaporizer.

4. A refrigeration system having a gas circuit including an evaporator and an absorber, structure including said absorber providing a path of flow for liquid, a vapor operated impeller for promoting flow of gas in said gas circuit, a lift for elevating liquid from said path of flow to a level above said path of flow, and a vaporizer connected to receive liquid which has been elevated by said lift and deliver vapor to said impeller.

5. A vapor producer including a heated vessel, a circulation vessel at an elevation above said heated vessel, a conduit connecting said vessels, a vapor liquid lift for raising liquid into said upper vessel, a condenser arranged to convert vapor in said upper vessel to liquid, said vaporizer being adapted to be connected to a jet for causing flow of gas in the gas circuit of a diffusion type absorption refrigeration system, and said lift being connected to receive liquid from the absorption liquid circuit of said system.

6. A refrigeration system having a circuit for absorption liquid and a circuit for inert gas, there being a vapor jet for causing flow of gas in said gas circuit, there being combined with said system a fluid circuit including a vaporizer connected to supply vapor to said jet, a part through which liquid flows to said vaporizer and arranged to hold a column of liquid projecting above the level of liquid in said absorption liquid circuit, and a part arranged to receive liquid from said absorption liquid circuit and operative to raise such liquid to the upper end of said column.

7. A method of refrigerating which includes circulating absorption liquid in a path of flow, flowing inert gas in a circuit, in one part of which the gas is brought into contact with the absorption liquid, causing flow of gas in said circuit by propulsion with a jet of vapor, providing vapor for said jet by vaporization of absorption liquid, obtaining absorption liquid to be vaporized by withdrawing absorption liquid from said path of flow and raising the withdrawn absorption liquid to an elevation above said path of flow for absorption liquid to provide a liquid head for exerting pressure on vapor supplied to said jet.

8. A method as set forth in claim 7 in which said raising of absorption liquid is carried out by vapor lift action.

9. A method as set forth in claim 7 in which said raising of absorption liquid is carried out by vapor lift action, the lifting vapor being formed by heating of withdrawn absorption liquid, and the lifting vapor being re-liquefied at said upper elevation.

10. A method of refrigeration which includes the steps of utilizing vapor issuing from a jet to cause circulation of inert gas in a circuit, circulating absorption liquid in a path of flow in one part of which liquid passes in contact with gas in said circuit, withdrawing from a part of said path of flow absorption liquid after being in contact with said gas, vaporizing withdrawn absorption liquid to produce vapor for said jet, and, prior to vaporizing withdrawn absorption liquid, raising the withdrawn absorption liquid to an elevation above said path of flow to form a liquid column head producing pressure for operating said jet.

THOMAS K. SHERWOOD.